United States Patent [19]

Funk et al.

[11] 4,448,447
[45] May 15, 1984

[54] COUPLING FOR PRESSURE LINES

[75] Inventors: Hans G. Funk; Frank Neumann; Dankmar Schaefer, all of Hungen, Fed. Rep. of Germany

[73] Assignee: Johannes Schaefer vormals Stettiner Schraubenwerke GmbH & Co. KG, Hungen, Fed. Rep. of Germany

[21] Appl. No.: 353,793

[22] Filed: Mar. 2, 1982

[30] Foreign Application Priority Data

Mar. 7, 1981 [DE] Fed. Rep. of Germany ....... 3108651

[51] Int. Cl.$^3$ .......................... F16L 37/00; F16L 5/00; F16L 39/00
[52] U.S. Cl. ......................................... 285/4; 285/158; 285/319; 285/321; 285/DIG. 22
[58] Field of Search ............... 285/162, 158, DIG. 22, 285/4, 321, 319

[56] References Cited

U.S. PATENT DOCUMENTS

| 1,904,061 | 4/1933 | Larson | 285/319 X |
| 3,565,467 | 2/1971 | Haldopolous | 285/319 X |
| 3,885,851 | 5/1975 | Bennett | 285/319 X |
| 4,045,055 | 8/1977 | Blakely | 285/322 X |
| 4,219,222 | 8/1980 | Brusadin | 285/DIG. 22 |

FOREIGN PATENT DOCUMENTS

173580  12/1921  United Kingdom ............... 285/319

Primary Examiner—Richard J. Scanlan, Jr.
Attorney, Agent, or Firm—Flynn, Thiel, Boutell & Tanis

[57] ABSTRACT

A coupling includes a receiving part having an external thread which can be screwed into a threaded bore and includes a plug-in part, which can be plugged into and coupled to the receiving part. A retaining ring is secured to the front end of the receiving part, for example through engagement with a groove in the receiving part, and during plugging in of the plug-in part engages a groove provided in the plug-in part. Widening of the retaining ring is limited by the wall of the threaded bore. By unscrewing the receiving part from the threaded bore, the retaining ring can be released by widening it at an interrupting slot, after which the plug-in part can be removed from the receiving part. The coupling is short, which is achieved in such a manner that, due to the arrangement of the retaining ring at the front end of the receiving part, the entire length of the receiving part can be used as a guide for the plug-in part.

19 Claims, 12 Drawing Figures

COUPLING FOR PRESSURE LINES

FIELD OF THE INVENTION

This invention relates to a coupling for a pressure line and, more particularly, to a coupling for connecting a compressed-air line to a member of a compressed-air brake of a motor vehicle, including a plug-in part having a hole therethrough, a receiving part having a hole therethrough and having an external thread which can be screwed into a threaded hole in the member, and an elastically spreadable retaining ring which lockingly engages the plug-in part and the receiving part and fixes these parts against movement in an axial direction relative to one another.

BACKGROUND OF THE INVENTION

Plug-in connections have the advantage, as compared with screw connections, that the connection of lines is substantially easier, since in place of an often difficult and time-consuming screwing in at locations which are sometimes difficult to reach, a single insertion movement is sufficient. Plug-in connections of the mentioned type are already known from German Offenlegungsschrift No. 28 56 069, in which the receiving part is constructed as an adapter which permits plug-in connections to be effected with members which have a standardized threaded hole for a screw connection, for example braking cylinders. In such conventional couplings, however, the retaining ring is located near the rear end of the receiving part, which results in a relatively long length of the coupling.

A basic purpose of the invention is therefore to provide a coupling of the above-mentioned type having a length which is relatively short.

SUMMARY OF THE INVENTION

This purpose is attained according to the invention by providing a coupling in which the retaining ring is arranged at the front end of the receiving part, is form-lockingly fixed against axial movement relative thereto, and extends over the front surface of the receiving part and engages an external groove provided in the plug-in part.

In a coupling which is constructed in this manner, the entire length of the plug-in part is received in the receiving part and the plug-in part is locked to the receiving part at its front end. This results in the requisite guiding length for the plug-in part, but without the receiving part projecting substantially beyond the rear end of the threaded hole in the member. The receiving part can thus be constructed so that the portion projecting beyond the threaded hole is only a pipe stem and a portion which is generally hexagonal and has wrench engagement surfaces.

The form-locking securing of the retaining ring on the receiving part can occur in many ways, several examples of which are disclosed herein. Some of the disclosed embodiments have the advantage that the receiving part is a simple turned part which, aside from the turning operations, requires no working. Also, some of the embodiments have the advantage that the inside diameter of the hole through the plug-in part can be relatively large, since a portion is omitted which, in another embodiment, defines a wall at the base of a groove.

Particularly advantageous is an embodiment in which the difference between the inside diameter of the threaded hole in the member and the outside diameter of the retaining ring is less than the difference between the diameter of the portion of the plug-in part located between the front surface and the external groove thereof and the inside diameter of the portion of the retaining ring which engages the outer groove. This offers additional security against an unintended removal of the plug-in part. The retaining ring, namely due to engagement with the threaded hole, cannot widen sufficiently far so that it can leave the external groove in the receiving part or the external groove of the plug-in part. It is prticularly advantageous when the outside diameter of the retaining ring is approximately equal to the inside diameter of the threaded hole.

In a further development, a recess provided at the rear end of the receiving part receives an inexpensive element, namely an elastic sealing ring, which is utilized for producing axial forces and simultaneously has the effect that penetration of dirt into the gap area of the coupling is avoided, namely into the area in which the plug-in part fits closely within the receiving part. A further seal which is arranged advantageously in the gap area is therefore not endangered by dirt. Particularly efficient sealing is obtained with an annular seal having a rectangular cross-sectional shape and a recess for the seal having facing cylindrical surfaces, the outer cylindrical surface preferably having an adjacent frustoconical surface.

An embodiment providing wrench engagement surfaces on the plug-in part has the advantage that the plug-in part can be held against rotation when the receiving part is unscrewed. It is thus possible to avoid twisting of the hose which is connected to the plug-in part, even when the plug-in part is stuck in the receiving part, for example due to the effect of spray water, particularly water containing salt.

Spreading surfaces to facilitate the widening of the retaining ring can advantageously be arranged on both the plug-in part and the retaining ring. This is, however, not absolutely necessary, since a spreading surface on only one of these parts will make the spreading easier.

The retaining ring preferably has a rear portion with a cylindrical outer surface which is connected by a thin constricting portion to a locking portion which converges forwardly. This cross-sectional shape of the ring makes the spreading thereof easier, since the ring is rendered relatively flexible in the area thereof which must be widened. A slot which interrupts the ring permits the insertion of the retaining ring into the receiving part with a small deformation of the retaining ring. When dimension relationships and the elasticity of the retaining ring are such that the retaining ring can, through radial expansion, be mounted on the receiving part without an interrupting slot, it is possible to provide a breaking point which is to be broken only when the retaining ring is to be removed from the receiving part, for example by means of a screw driver. Through weakening grooves in the ring, flexible segments can be formed which permit plugging in of the plug-in part with relatively little force.

The retaining ring may consist of various materials. Particularly suitable are thermoplastic materials, for example a copolymer of polymethylenoxide, such as that which can be purchased under the registered trademark Hostaform. The use of thermoplastic material permits the manufacture of the retaining ring as a plastic molded part, which is particularly economical.

BRIEF DESCRIPTION OF THE DRAWINGS

Exemplary embodiments of the invention are illustrated in the drawings, in which.

DETAILED DESCRIPTION

Figure 1:
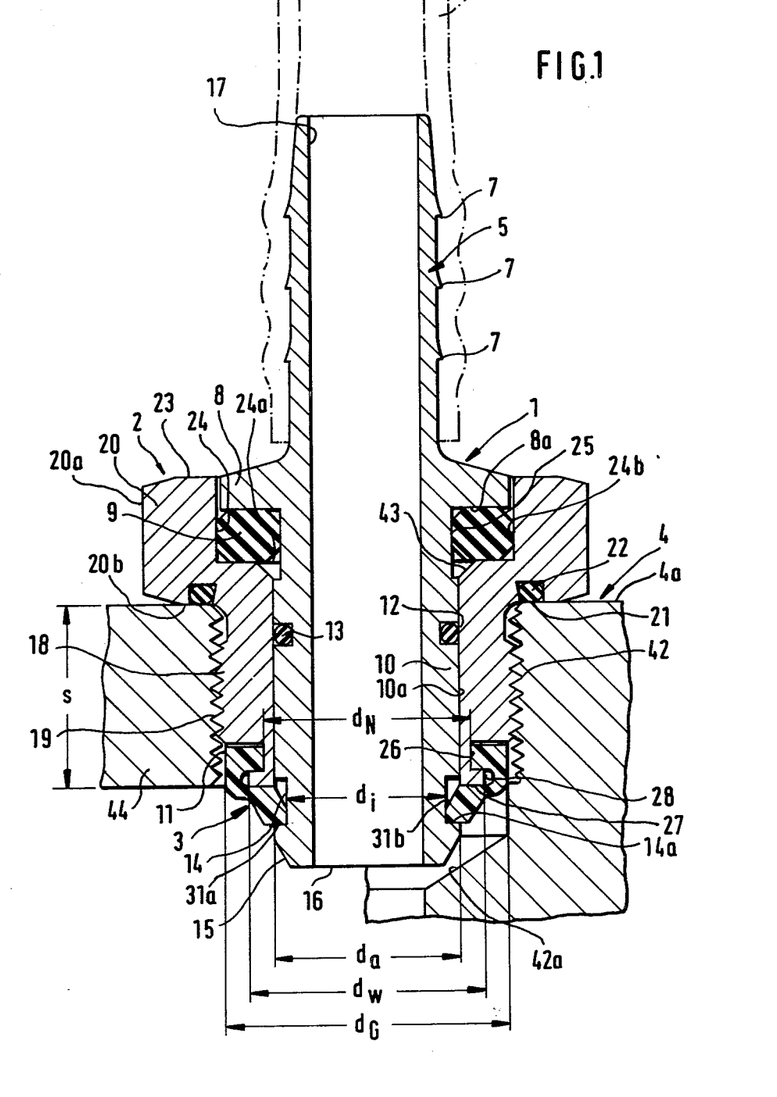
FIG. 1 is a longitudinal sectional view of a coupling according to a first embodiment of the invention in which a retaining ring is held in an outer groove of a receiving part.

A coupling is illustrated in FIG. 1, the main parts of which are a plug-in part 1, a receiving part 2 and a retaining ring 3. The receiving part 2 is screwed into a threaded bore 42 provided in member 4 which might, for example, be the housing of a braking cylinder.

The plug-in part 1 has thereon a pipe 5 for receiving a hose 6 which is indicated by dash-dotted lines. The pipe 5 has, in a conventional manner, circumferential ribs 7 which have barb-shaped cross sections and resist removal of the hose 6.

A flange 8 is provided on the plug-in part 1 below the pipe 5, the bottom surface 8a of which presses against an elastic sealing ring 9 in the mounted condition of the coupling. Below the flange 8 is provided a fitting portion 10 having a cylindrical outer surface 10a which closely fits in a cylindrical bore 11 provided through the receiving part 2. An external annular groove 12, in which is disposed a sealing ring 13 which sealingly engages the bore wall 11, is provided in the fitting portion 10.

An external annular groove 14, which is engaged in the mounted condition of the plug-in 1 by the retaining ring 3, is provided on the plug-in part 1 at the lower end of the fitting area 10. The plug-in part 1 has an outwardly facing frustoconical surface 15 below the groove 14 which converges forwardly, the lower end surface 16 of the plug-in part 1 being considered its front surface.

The plug-in part 1 has therethrough a hole 17, the inside diameter of which is approximately equal to the inside diameter of the hose 6.

The receiving part 2 has a portion 18 which has an external thread 19 thereon. A radially outwardly projecting flange 20 having a relatively large thickness is provided immediately rearwardly of the threaded portion 18 and has external surfaces 20a which serve as wrench engagement surfaces, namely, are arranged as a hexagon.

An annular groove 21 is provided in the bottom surface 20b of the flange 20, which groove receives an annular elastic seal 22 which engages the upper surface 4a of the member 4 when the receiving part 2 has been screwed into the bore 42.

The receiving part 2 has at its rear end, the upper end surface 23 thereof being the rear end surface, a large, generally cylindrical recess 24 which receives the already mentioned elastic sealing ring 9. The ring 9 sealingly engages the bottom surface 24a and the circumferential side surface 24b of the recess 24. It also engages the already mentioned bottom surface 8a of the flange 8 and engages a cylindrical surface 25 provided on the plug-in part 1 between the flange 8 and the fitting portion 10.

An external annular groove 26 is provided near the front end of the receiving part 2, which groove is engaged by the retaining ring 3. The groove 26 is separated from the front surface 27 of the receiving part 2 by a radial wall 28 which has a diameter $d_W$. The diameter $d_W$ is, naturally, larger than the diameter $d_N$ of the innermost or bottom surface of the groove 26.

The retaining ring 3 is preferably a plastic part which is molded in one piece. The cross section thereof can be divided conceptually into a retaining portion 29 (FIG. 3), a constricting portion 30 and a locking portion 31. The retaining portion 29 has a cylindrical outer wall 32 with a diameter $d_H$ and an annular, radially inwardly projecting flange 32a. The locking portion 31 has a flat front surface 31a, which cooperates with the front wall 14a of the external groove 14 in the plug-in part 1. A frustoconical surface 31b which converges forwardly and serves as a guide bevel is also provided on the locking part 31. The inside diameter $d_E$ of the constricting area 30 is larger than the outside diameter $d_W$ of the radial wall 28 on the receiving part 2 and is defined by an annular groove 33 provided between the retaining portion 29 and the locking portion 31, the width of the groove 33 being approximately equal to the thickness of the wall 28. As a whole, the locking portion 31 converges forwardly toward the end surface 31a.

Figure 3:
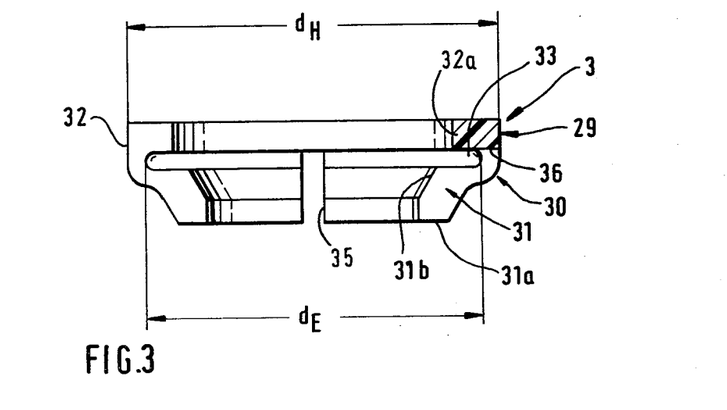
FIG. 3 is a sectional view of the retaining ring taken along line III—III of FIG. 2.

The inside diameter of the retaining ring 3, at its narrowest point, is identified with $d_i$. The plug-in part 1 has, below the external groove 14, a diameter $d_a$ which equals or is slightly smaller than the diameter of the fitting portion 10 but is by no means larger than the diameter $d_a$.

Figure 2:
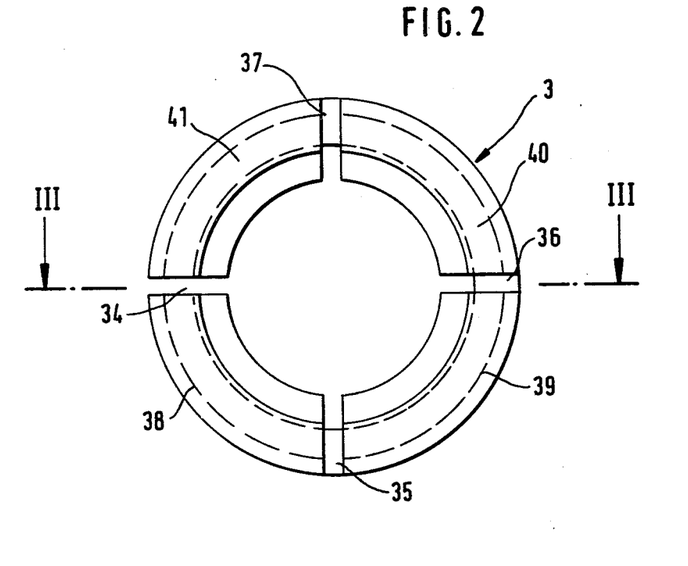
FIG. 2 is a bottom view of the retaining ring of FIG. 1 which is slightly enlarged as compared with FIG. 1.

The retaining ring 3 has a radial slot 34 which totally interrupts it, and has three weakening slots 35, 36 and 37. As one can see from FIG. 3, the weakening slots interrupt the locking portion 31 and the constricting portion 30 but do not interrupt the retaining portion 29. The slot 34 and the slots 35, 36 and 37 divide the ring in its locking portion 31 into four segments 38, 39, 40 and 41 which can be flexed outwardly relatively easily, since they are connected to the retaining portion 29 only through the thin constricting portion 30.

The coupling of FIG. 1 operates as follows. First, the receiving part 2 is screwed into the threaded bore 42 in the member 4, which bore 42 may be a standardized hole. The sealing ring 22 thereby sealingly engages the surface 4a on the member 4. The retaining ring 3 is already mounted on the receiving part 2 prior to such screwing in. This mounting was effected by first circumferentially spreading the retaining ring which, due to the interruption at the slot 34, is easily possible. The ring 3 was then moved axially over the wall 28. Due to the elasticity of the ring 3, when released it returned to its original shape and the retaining area 29 of the ring engaged the groove 26. Since the outside diameter $d_H$ of the retaining area 29 of the ring 3 is slightly smaller than the inside diameter $d_G$ of the threaded bore 42, it did not hinder the screwing of the receiving part 2 into the bore 42.

The plug-in part 1 can now be mounted through a simple plugging in, the annular seals 13 and 9 being held nonlosably on the plug-in part. When the plug-in part 1 is plugged into the receiving part 2, the alignment of the fitting area 10 and the bore 11 is made easier through cooperation of the conical surface 15 on the plug-in part 1 and a frustoconical surface 43 provided on the receiving part 2 at the upper end of the bore 11. The retaining portion of the ring 3 is spread apart by engagement of the conical surface 15 on the plug-in part 1 with the conical surface 31b on the retaining ring 3, thereby moving the four segments 38, 39, 40 and 41. A widening of the ring sufficiently far so that it could leave the groove 26 is not possible, since its outside diameter $d_H$ and the inside diameter $d_G$ of the threaded bore 42 are selected with respect to one another so that the retaining portion 29 of the ring can be widened only a little or possibly not at all as long as the receiving part 2 is screwed into the bore 42.

When the plug-in part 1 is fully inserted, the segments 38 to 41 snap inwardly into the groove 14 to lock the plug-in part 1 in place. The seal 9 is compressed in this condition.

After letting go of the plug-in part 1, same remains fixedly locked with respect to the receiving part 2, whereby the elasticity of the seal 9 presses the plug-in part 1 upwardly in FIG. 1. Through this, the lower groove wall 14a of the groove 14 is pressed firmly against the bottom surface 31a of the retaining ring 3 and an absolutely wobble-free fit is obtained, which is advantageous for the function of the seal 13.

A release of the coupling is only possible by unscrewing the receiving part 2 from the bore 42. In the unscrewed condition, expansion of the retaining ring 3 is no longer restricted, and it can be expanded sufficiently far that the segments 38 to 41 leave the groove 14.

A connecting bore of the type common for screw connections and having a base 42a is illustrated in the right half in FIG. 1. The coupling, however, is also suited for being screwed into relatively thin walls 44, as illustrated in the left half of FIG. 1, namely into walls having a thickness s which is sufficiently large so that the retaining portion 29 of the retaining ring 3 will be axially aligned with at least part of the bore wall.

The plug-in part 1 can, after insertion into the receiving part 2, still be rotated relative to the receiving part 2. This is particularly of interest if the plug-in part is of angled construction. Such embodiments, of course, fall within the scope of the invention.

Figures 4, 4A:
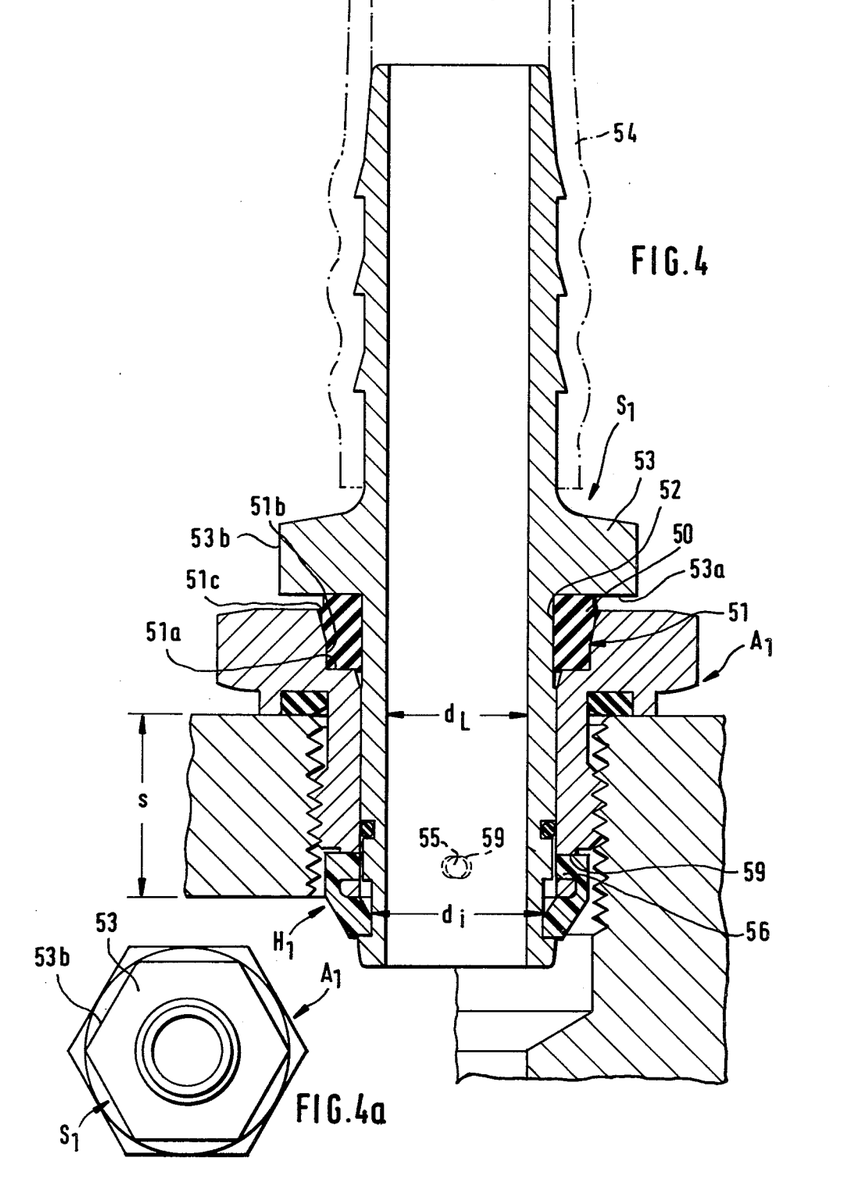
FIG. 4 is a longitudinal sectional view similar to FIG. 1 of a coupling according to a second embodiment of the invention in which the retaining ring has projections which engage holding bores.
FIG. 4a is a top view of the coupling of FIG. 4 in a scale which is reduced as compared with FIG. 4.
Figure 5:
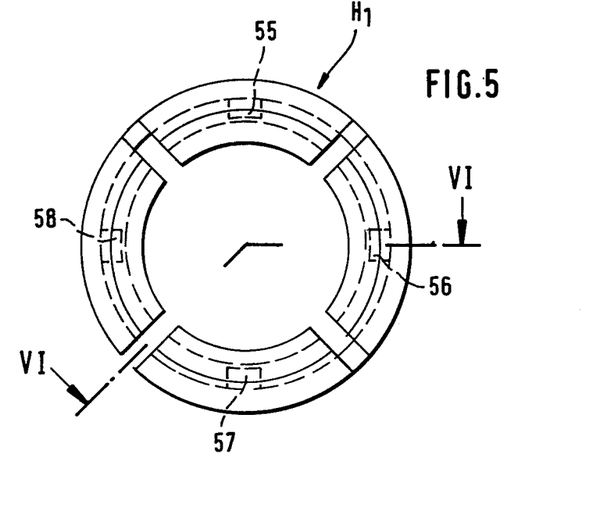
FIG. 5 is a bottom view of the retaining ring of FIG. 4.
Figure 6:
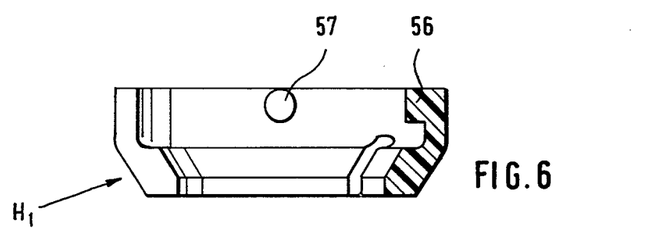
FIG. 6 is a sectional view of the retaining ring taken along line VI—VI of FIG. 5.

The embodiment according to FIGS. 4 to 6 differs from the embodiment according to FIGS. 1 to 3 with respect to the structural features relating to the upper sealing ring 50 (which corresponds to the ring 9 in FIG. 1) and with respect to the retaining ring $H_1$. The sealing ring 50 is illustrated in its tensioned condition in FIG. 4, but has in its relaxed condition a generally rectangular cross section. When the plug-in part $S_1$ is inserted, the seal 50 is compressed somewhat and assumes the shape according to FIG. 4.

The seal 50 is disposed in a recess in the receiving part 2 which as a whole is identified with reference numeral 51. This recess has a flat bottom wall 51a, a cylindrical wall section 51b and a frustoconical wall section 51c. The diameter of the section 51a is dimensioned so that the outer surface of the seal 50 rests on the cylindrical wall 51b. The inner wall of the seal 50 rests on a cylindrical outer surface 52 of the plug-in part $S_1$.

A further difference from the exemplary embodiment according to FIGS. 1 to 3 is that the surface 53a which engages the seal 50 is provided on a collar 53 which has wrench engagement surfaces 53b thereon which are, for example, constructed as a hexagon. This has the advantage that the plug-in part $S_1$ can be held against rotation when the receiving part $A_1$ is screwed out of the member 4. Twisting of the hose 54 can be avoided in this manner.

The retaining ring, which as a whole is identified with $H_1$, has on its inside four projections 55 to 58 at 90° intervals which project inwardly. These projections engage four holes 59 which are provided in the receiving part $A_1$ and extend completely through the wall of the receiving part, which wall is of reduced thickness at this point. In comparison to the embodiment according to FIGS. 1 to 3, the advantage is achieved that the inside diameter $d_L$ of the plug-in part $S_1$ can be larger. This is due to the omission of the wall portion which, in the embodiment according to FIGS. 1 to 3, defines the base of the groove 26.

Figure 7:
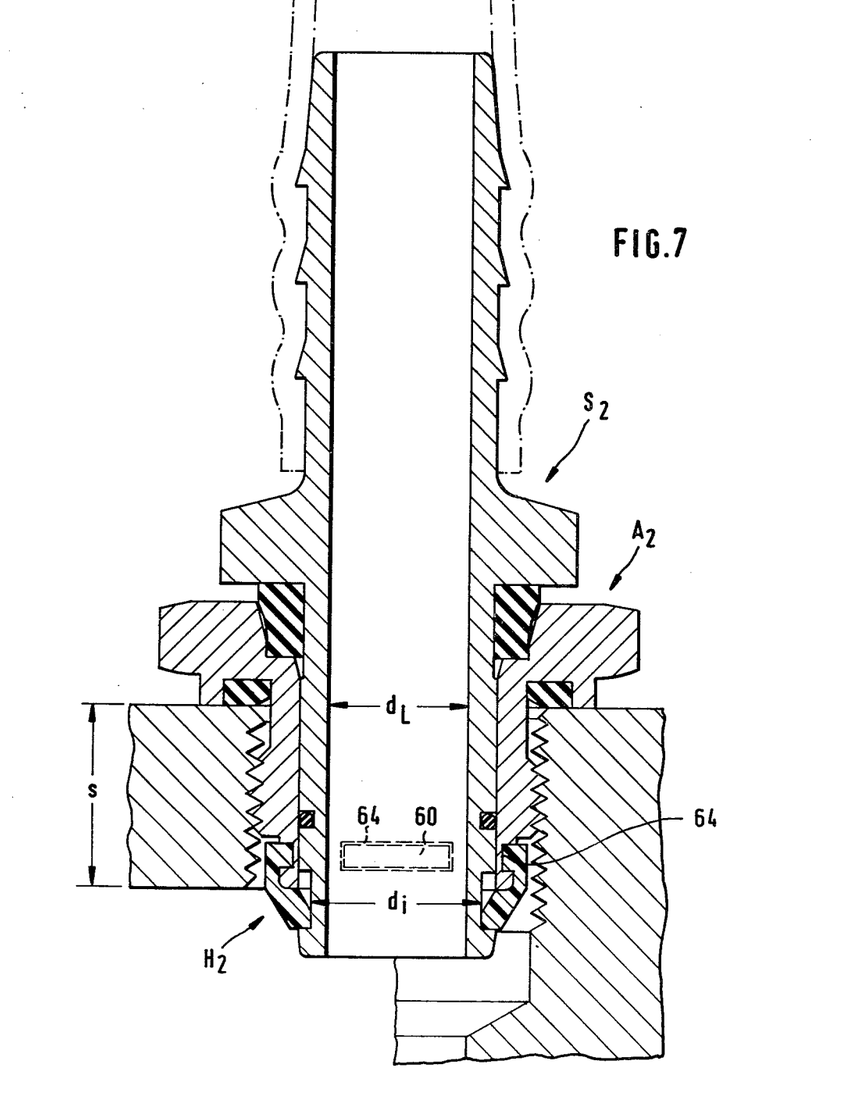
FIG. 7 is a longitudinal sectional view of a third embodiment of the coupling of FIG. 1 in which the retaining ring is held on the receiving part by tangential webs.
Figure 8:
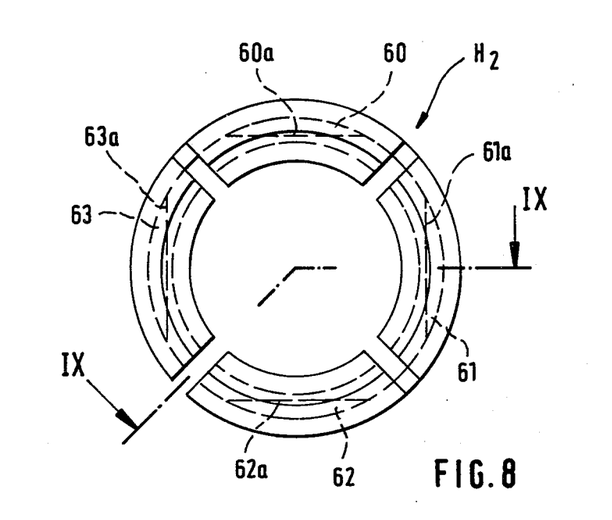
FIG. 8 is a bottom view of the retaining ring of FIG. 7.
Figure 9:
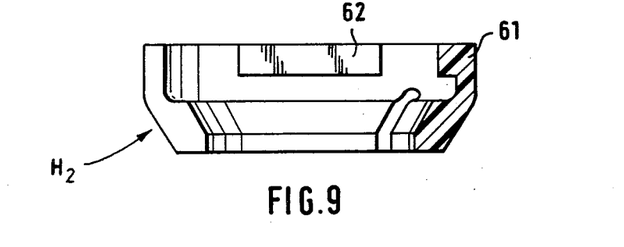
FIG. 9 is a sectional view of the retaining ring taken along line IX—IX of FIG. 8.

In the embodiment according to FIGS. 7 to 9, the plug-in part is identified with $S_2$, the receiving part with $A_2$ and the retaining ring with $H_2$. This embodiment differs from the embodiment according to FIGS. 4 to 6 in the structure and manner of fastening of the retaining ring $H_2$. The retaining ring $H_2$ has on its inside surface four radially inwardly projecting webs 60 to 63. These webs have respective flat surfaces 60a to 63a thereon which, on adjacent webs, are positioned at right angles to one another. The webs are thus angularly offset by 90° with respect to each other.

Four angularly spaced grooves 64 which respectively correspond to the webs 60 to 63 are provided in the receiving part $A_2$, each of which grooves is engaged by the associated web. With this construction, it is again possible to keep the inside diameter $d_L$ relatively large by allowing each straight groove 64 to have a depth which extends radially inwardly approximately to the inside diameter of the receiving part $A_2$, since this leaves in the area between the grooves 64 sufficient material to assure a solid connection between the portions of the receiving part $A_2$ which lie below and above the grooves 64.

Figure 10:
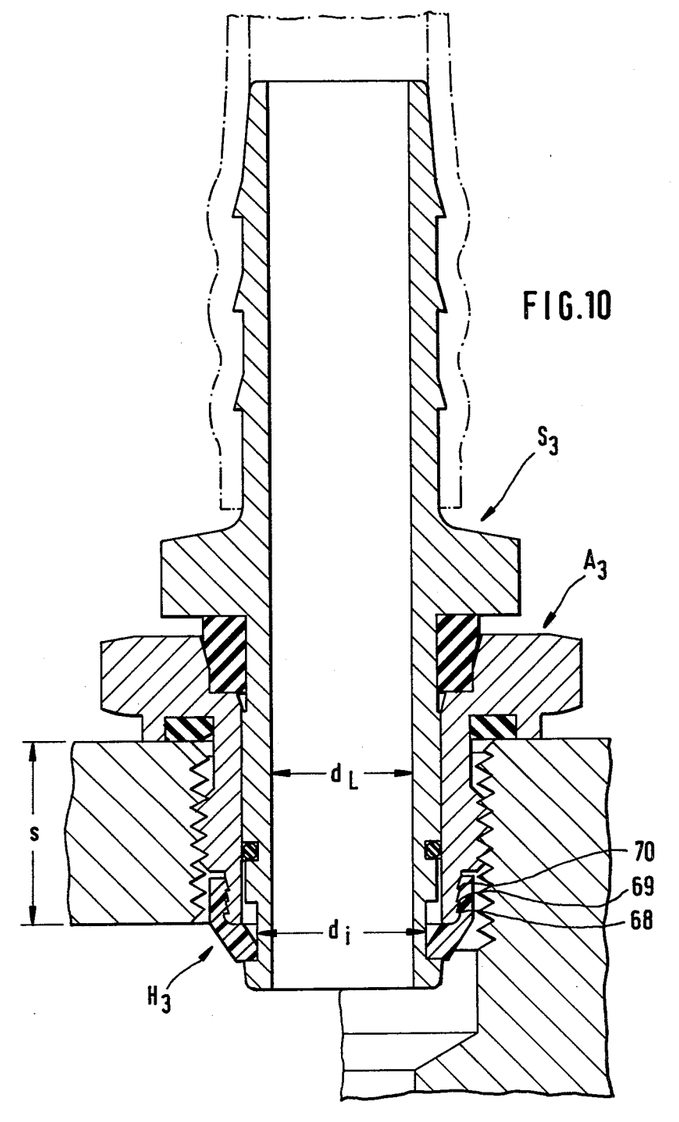
FIG. 10 is a longitudinal sectional view of a fourth embodiment of the invention in which the retaining ring is held by several grooves of the receiving part.
Figure 11:
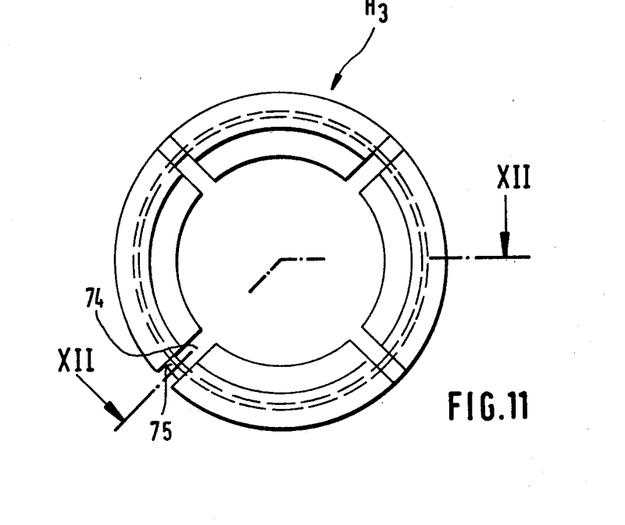
FIG. 11 is a bottom view of the retaining ring of FIG. 10.
Figure 12:
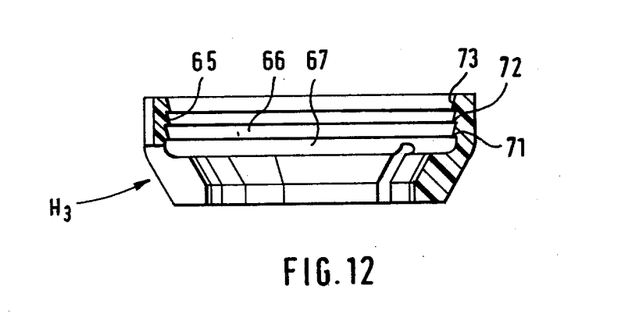
FIG. 12 is a section view of the retaining ring taken along line XII—XII of FIG. 11.

In the embodiment according to FIGS. 10 to 12, the main parts are identified with $S_3$, $A_3$ and $H_3$. This embodiment also differs from the embodiments according to FIGS. 4 to 9 with respect to the manner of fastening the retaining ring $H_3$ on the receiving part $A_3$. The retaining ring $H_3$ has three circumferential grooves 65, 66 and 67 on its inside and these grooves define projections 71, 72 and 73 having a saw-toothlike profile which is oriented so that the retaining ring H₃ can easily be moved onto the receiving part A₃ but its removal is difficult or not possible without expanding the retaining ring H₃.

Grooves 68, 69 and 70 are also provided on the receiving part A₃ and the projections 71, 72 and 73 provided on the retaining part H₃ act as barbs which claw into the grooves 68, 69 and 70.

The retaining ring H₃ is completely circumferentially closed prior to and after its installation on the receiving part A₃. In the area of one radial slot 74 there is provided a weakened connecting web 75 which serves as a breaking point. If removal of the retaining ring is needed, the ring can be opened by breaking the weakened web 75, which permits the retaining ring to be expanded sufficiently so that it can be removed. After this, further use of that retaining ring is not possible if the grooves 68, 69 and 70 are as flat as is illustrated, because cooperation between the retaining ring H₃ and the bore wall is no longer sufficient to keep the projections 71, 72 and 73 securely engaged with the grooves 68, 69 and 70.

The embodiment according to FIGS. 10 to 12 also permits a relatively large inside diameter $d_L$, since the distribution of the axial retaining forces onto several grooves 68, 69 and 70 permits these grooves to be constructed relatively flat.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined s follows:

1. A coupling adapted to connect a pressure line to a member having a threaded hole therein, comprising a receiving part having a hole therethrough and having an external thread which can be screwed into said threaded hole in said member, a plug-in part having a hole therethrough and slidably received in said hole through said receiving part, and an elastically expansible retaining ring which lockingly engages said plug-in part and said receiving part so as to fix said plug-in part and said receiving part against relative movement in an axial direction; said retaining ring being located near one end of said receiving part, extending over a surface on said one end of said receiving part, having a portion which engages an external groove provided in said plug-in part, and having projections thereon which engage recesses provided in said receiving part; and wherein said recesses are straight grooves and said projections are tangential webs which are offset with respect to one another by equal angular intervals.

2. A coupling adapted to connect a pressure line to a member having a threaded hole therein, comprising a receiving part having a hole therethrough and having an external thread which can be screwed into said threaded hole in said member, a plug-in part having a hole therethrough and slidably received in said hole through said receiving part, and an elastically expansible retaining ring which lockingly engages said plug-in part and said receiving part so as to fix said plug-in part and said receiving part against relative movement in an axial direction; said retaining ring being located near one end of said receiving part, extending over a surface on said one end of said receiving part, having a first portion which engages an external groove provided in said plug-in part, and having a second portion disposed within said threaded hole in said member, the difference between the inside diameter of said threaded hole in said member and the outside diameter of said second portion of said retaining ring being less than the difference between the diameter of a portion of said plug-in part located between an end thereof and said external groove and the inside diameter of said first portion of said retaining ring which engages said external groove.

3. The coupling according to claim 2, wherein the outside diameter of said second portion of said retaining ring is equal to or is slightly less than the inside diameter of said threaded hole in said member.

4. The coupling according to claim 3, wherein said retaining ring has an angled cross section, a rear portion (retaining portion) thereof being said second portion and having a cylindrical outer surface having said outside diameter, and a front portion (locking portion) thereof being said first portion and converging forwardly toward the axis of said retaining ring, said first and second portions being connected with one another by a thin constricting portion.

5. A coupling adapted to connect a pressure line to a member having a threaded hole therein, comprising a receiving part having a hole therethrough and having an external thread which can be screwed into said threaded hole in said member, a plug-in part having a hole therethrough and slidably received in said hole through said receiving part, and an elastically expansible retaining ring which lockingly engages said plug-in part and said receiving part so as to fix said plug-in part and said receiving part against relative movement in an axial direction; said retaining ring being located near one end of said receiving part, extending over a surface on said one end of said receiving part, and having a portion which engages an external groove provided in said plug-in part; wherein at an end of said receiving part remote from said one end a recess is provided which receives an elastic seal which, when said plug-in part and said receiving part are coupled, engages a shoulder provided on said plug-in part and applies an axial force onto said plug-in part, said axial force urging said plug-in part against said portion of said retaining ring.

6. The coupling according to claim 5, wherein said elastic seal, in its relaxed condition, has a rectangular cross section, and wherein said recess which receives said elastic seal has a cylindrical cross section, an inner surface of said elastic seal engaging said plug-in part.

7. The coupling according to claim 6, wherein said recess has a cylindrical surface which transfers into an outwardly enlarging, conical surface which is engaged by said elastic seal in its compressed condition.

8. The coupling according to claim 5, claim 6 or claim 7, wherein said shoulder on said plug-in part is a collar which projects outwardly from said plug-in part and has thereon wrench engagement surfaces.

9. A coupling, comprising: a generally cylindrical receiving part having a central portion between its ends which has an outwardly projecting external thread on an exterior surface thereof, having a generally cylindrical hole therethrough substantially coaxial with said exterior surface of said central portion, and having at one end thereof an end portion which has an outside diameter smaller than the outside diameter of said central portion; a plug-in part having a generally cylindrical exterior surface which has an outside diameter approximately equal to the inside diameter of said hole through said receiving part, having an axially extending opening therethrough, and having a circumferentially extending groove in said exterior surface thereof, said plug-in part being slidably receivable within said hole through said receiving part; and a resiliently expansible retaining ring having a first portion which encircles and is fixed against axial movement relative to said end portion of said receiving part, a second portion which extends axially from said first portion past said one end of said receiving part, and a third portion which extends inwardly from the end of said second portion remote from said first portion, said third portion of said retaining ring engaging said groove in said plug-in part when said plug-in part is slidably received in said hole through said receiving part, said first portion of said retaining ring having an outside diameter which is larger than the outside diameter of said third portion of said retaining ring, and said third portion of said retaining ring being resiliently expansible relative to said first portion; and wherein the difference between the outside diameter of said first portion of said retaining ring and the outside diameter of said exterior surface of said central portion of said receiving part is less than the difference between the inside diameter of said third portion of said retaining ring and the outside diameter of said plug-in part in the region of said groove therein.

10. The coupling according to claim 9, including a circumferential groove provided in the exterior surface of said end portion of said receiving part, and a radially inwardly projecting flange which is provided on said first portion of said retaining ring and is received in said groove in said end portion of said receiving part.

11. The coupling according to claim 9, including plural angularly spaced openings in the exterior surface of said end portion of said receiving part, and plural radially inward projections on said first portion of said retaining ring, each said projection being received in a respective said opening in said end portion of said receiving part.

12. The coupling according to claim 9, including plural axially spaced, circumferentially extending grooves of saw-tooth shape provided in an exterior surface of said end portion of said receiving part, and including plural, axially spaced, circumferentially extending, radially inward projections of saw-tooth shape on said first portion of said retaining ring, each said projection being received in a respective said groove in said end portion of said receiving part.

13. The coupling according to claim 9, wherein said third portion of said retaining ring has an inwardly facing, frusto-conical surface which converges in one axial direction, and wherein said plug-in part has an outwardly facing, frusto-conical surface on one end thereof which converges in said direction, said frusto-conical surface on said plug-in part engaging said frusto-conical surface on said retaining ring when said plug-in part is moved axially into said hole through said receiving part and effecting a resilient, radially outward expansion of said third portion of said retaining ring.

14. The coupling according to claim 9, including plural, angularly spaced, generally axially extending slots provided in said second and the third portions of said retaining ring.

15. The coupling according to claim 14, wherein one of said slots in said retaining ring also extends through and interrupts said first portion of said retaining ring.

16. The coupling according to claim 14, wherein said first portion of said retaining ring is circumferentially continuous and has breakable means at a selected angular location thereon for permitting an interruption of said first portion of said retaining ring to be selectively produced at said selected angular location thereon.

17. The coupling according to claim 9, wherein said retaining ring is a molded plastic part.

18. The coupling according to claim 9, wherein said plug-in part has a radially outwardly projecting flange thereon at a location spaced from said groove therein, said receiving part being located axially between said flange and said groove when said plug-in part is received in said hole through said receiving part, and including an annular seal encircling said plug-in part adjacent said flange, said annular seal being compressed between and sealingly engaging said flange on said plug-in part and an axially facing surface on said receiving part when said plug-in part is disposed in said hole through said receiving part.

19. The coupling according to claim 18, including a member having a threaded opening therein, said receiving part being threadedly received in said threaded opening in said member; including a flange provided on said receiving part at the end thereof opposite said one end; and including an annular seal encircling said receiving part adjacent said flange thereon, said annular seal being compressed between and sealingly engaging said flange on said receiving part and a surface of said member.

* * * * *